United States Patent
Champel

(10) Patent No.: US 11,968,374 B2
(45) Date of Patent: Apr. 23, 2024

(54) METHOD AND DEVICE FOR CODING AND DECODING

(71) Applicant: BEIJING XIAOMI MOBILE SOFTWARE CO., LTD., Beijing (CN)

(72) Inventor: Mary-Luc George Henry Champel, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 237 days.

(21) Appl. No.: 17/624,250

(22) PCT Filed: Jul. 3, 2019

(86) PCT No.: PCT/CN2019/094476
§ 371 (c)(1),
(2) Date: Dec. 30, 2021

(87) PCT Pub. No.: WO2021/000277
PCT Pub. Date: Jan. 7, 2021

(65) Prior Publication Data
US 2022/0360795 A1    Nov. 10, 2022

(51) Int. Cl.
*H04N 19/172* (2014.01)
*H04N 19/597* (2014.01)
*H04N 19/85* (2014.01)

(52) U.S. Cl.
CPC ......... *H04N 19/172* (2014.11); *H04N 19/597* (2014.11); *H04N 19/85* (2014.11)

(58) Field of Classification Search
CPC .... H04N 19/172; H04N 19/597; H04N 19/85; H04N 19/46
See application file for complete search history.

(56) References Cited

U.S. PATENT DOCUMENTS 10,432,970 B1 * 10/2019 Phillips ................ H04N 19/174
11,012,657 B2 * 5/2021 Hur ..................... H04N 5/44504
(Continued)

FOREIGN PATENT DOCUMENTS

WO    2018065663 A1    4/2018
WO    2018066982 A1    4/2018
(Continued)

OTHER PUBLICATIONS

M. Wien, J. M. Boyce, T. Stockhammer and W.-H. Peng, "Standardization Status of Immersive Video Coding," in IEEE Journal on Emerging and Selected Topics in Circuits and Systems, vol. 9, No. 1, pp. 5-17, Mar. 2019, doi: 10.1109/JETCAS.2019.2898948. (Year: 2019).*

(Continued)

*Primary Examiner* — Michael Robert Cammarata
(74) *Attorney, Agent, or Firm* — Arch & Lake LLP

(57) ABSTRACT

Provided are a method and device for video coding, video decoding and storage medium. The video coding method includes: classifying video frames into independent frames and dependent frames, which comprise a first type of the dependent frames; generating region wise packing (RWP) coding configuration of each of the independent frames by coding parameters of the respective one of the independent frames, wherein the RWP coding configuration of the independent frames comprises the parameters to be unpacked to restore the video; and for each of the first type of the dependent frames, generating RWP coding configuration of the dependent frame by coding parameters of the dependent frame based on difference and dependency between the parameters of the dependent frame and the parameters of an independent frame used as a reference for the coding of the dependent frame.

20 Claims, 4 Drawing Sheets

(56) References Cited

U.S. PATENT DOCUMENTS

| | | | |
|---|---|---|---|
| 11,165,958 B2* | 11/2021 | Kim | G06T 3/005 |
| 11,330,268 B2* | 5/2022 | Zhao | H04N 19/70 |
| 2018/0061002 A1* | 3/2018 | Lee | H04N 19/88 |
| 2019/0141311 A1 | 5/2019 | Lee et al. | |
| 2019/0238888 A1* | 8/2019 | Kim | H04N 19/119 |
| 2019/0320155 A1* | 10/2019 | Wang | H04N 13/161 |
| 2019/0356898 A1* | 11/2019 | Choi | H04N 13/178 |
| 2020/0107008 A1* | 4/2020 | Hur | H04N 13/183 |
| 2020/0244942 A1* | 7/2020 | Maze | H04N 21/4355 |
| 2021/0176509 A1* | 6/2021 | Maze | H04N 21/440227 |
| 2021/0337243 A1* | 10/2021 | Oh | H04N 19/597 |
| 2021/0377581 A1* | 12/2021 | Denoual | H04N 21/23439 |
| 2021/0385423 A1* | 12/2021 | Oh | H04N 19/597 |
| 2022/0078486 A1* | 3/2022 | Hannuksela | H04N 21/2393 |
| 2022/0159267 A1* | 5/2022 | Hannuksela | H04N 19/70 |
| 2022/0217274 A1* | 7/2022 | Kim | G06T 3/40 |
| 2022/0217314 A1* | 7/2022 | Oh | H04N 21/44 |
| 2022/0239949 A1* | 7/2022 | Hannuksela | H04N 21/435 |
| 2022/0256131 A1* | 8/2022 | Oh | H04N 19/184 |
| 2023/0328385 A1* | 10/2023 | Kim | H04N 19/129 348/36 |

FOREIGN PATENT DOCUMENTS

| | | |
|---|---|---|
| WO | 2018066983 A1 | 4/2018 |
| WO | 2018066988 A1 | 4/2018 |
| WO | WO-2019073113 A1 * | 4/2019 |
| WO | WO-2020070379 A1 * | 4/2020 |

OTHER PUBLICATIONS

M. M. Hannuksela, Y.-K. Wang and A. Hourunranta, "An Overview of the OMAF Standard for 360° Video," 2019 Data Compression Conference (DCC), Snowbird, UT, USA, 2019, pp. 418-427, doi: 10.1109/DCC.2019.00050. (Year: 2019).*

International Search Report of PCT Application No. PCT/CN2019/094476 dated Mar. 26, 2020 with English translation, (2p).

* cited by examiner

METHOD AND DEVICE FOR CODING AND DECODING

CROSS-REFERENCE TO RELATED APPLICATION

This application is the U.S. national phase application of International Application No. PCT/CN2019/094476, filed on Jul. 3, 2019, the entire contents of which are incorporated herein by reference for all purposes.

TECHNICAL FIELD

The disclosure relates to the field of video technology but is not limited to the field of video technology, and in particular, relates to a method and device for video coding and video decoding, and storage medium.

BACKGROUND

Omnidirectional Media Format (OMAF) is known as an MPEG-I (Moving Picture Experts Group) standard. As most likely the first industry standard on virtual reality (VR), the development of OMAF was derived from a desire in VR standardization of MPEG. In particular, OMAF defines a media format that enables omnidirectional media applications, which focus on 360° video, images, audio, etc. A projection and rectangular region-wise packing method is proposed for coding the 360° video, but this method results in a large signaling overhead.

SUMMARY

The present disclosure provides a method and device for coding and decoding, and storage medium.

A first aspect according to embodiments of the present disclosure provides a video coding method. The method includes:
  classifying video frames into independent frames and dependent frames, which include a first type of the dependent frames;
  generating region wise packing (RWP) coding configuration of each of the independent frames by coding parameters of the respective one of the independent frames, wherein the RWP coding configuration of the independent frames includes the parameters to be unpacked to restore the video; and
  for each of the first type of the dependent frames, generating RWP coding configuration of the dependent frame by coding parameters of the dependent frame based on difference and dependency between the parameters of the dependent frame and the parameters of an independent frame used as a reference for the coding of the dependent frame.

A second aspect according to embodiments of the present disclosure provides a video decoding method. The method includes:
  obtaining parameters of each of independent frames by unpacking a RWP coding configuration of the respective independent frame;
  for each dependent frames, obtaining parameters of the dependent frame by decoding the RWP coding configuration of the dependent frame, based on the parameters of the respective independent frame corresponding to the dependent frame, wherein the dependent frame at least includes a first type dependent frames; and
  unpacking video frames, at least based on the parameters of the independent frames and the parameters of the first type of the dependent frames.

A third aspect according to embodiments of the present disclosure provides a processing device. The device at least includes: a processor and a memory for storing executable instructions capable of running on the processor. When executing the executable instructions, the processor performs steps of the above coding method or steps of the above decoding method.

A fourth aspect according to embodiments of the present disclosure provides a non-transitory computer storage medium containing executable computer instructions for performing steps of the above coding method or steps of the above decoding method.

DETAILED DESCRIPTION

Figure 1:
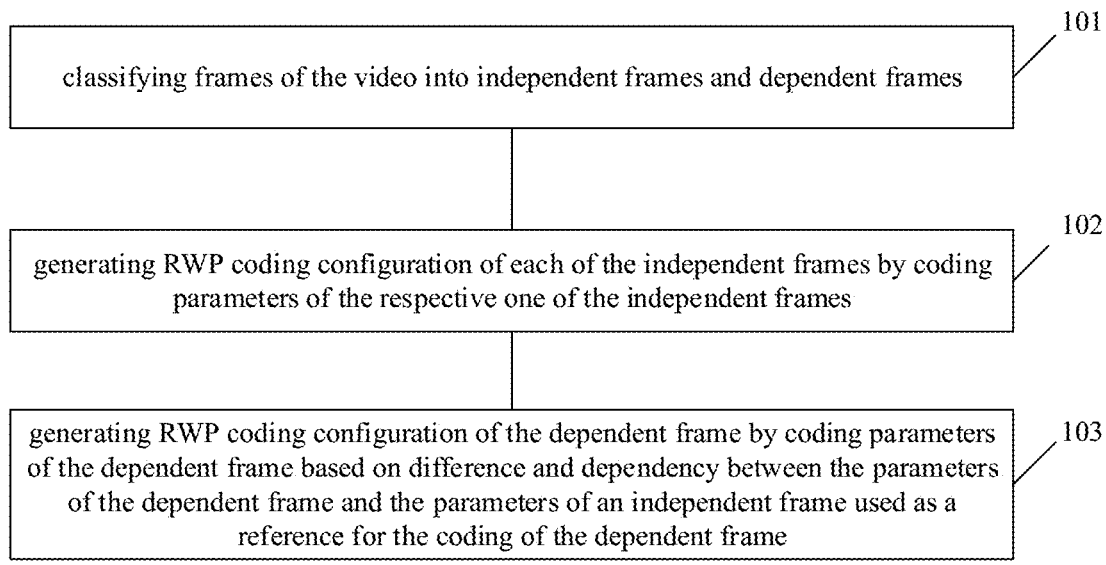
FIG. 1 is a flow chart of a coding method provided by embodiments of the present disclosure.

Embodiments of the present disclosure provide a video coding method. As illustrated in FIG. 1, the method includes:
  101, classifying video frames into independent frames and dependent frames, which include a first type of the dependent frames;
  102, generating RWP coding configuration of each of the independent frames by coding parameters of the respective one of the independent frames, wherein the RWP coding configuration of the independent frames includes the parameters to be unpacked to restore the video; and
  103, for each of the first type of the dependent frames, generating RWP coding configuration of the dependent frame by coding parameters of the dependent frame based on difference and dependency between the parameters of the dependent frame and the parameters of an independent frame used as a reference for the coding of the dependent frame.

The above steps provide a method for coding a video.

The video includes at least two frames. In the present disclosure, the video may be an OMAF 360° video. And a typical OMAF 360° video is a video, which may be a stereoscopic video, and supports three degrees of freedom (3DOF) navigation including yaw, roll, and pitch movements.

The OMAF 360° videos can be used in virtual reality (VR) technology and/or augmented reality (AR) technology. And the OMAF 360° videos include the following aspects:

1) a coordinate system:
the coordinate system consists of a unit sphere and three coordinate axes, namely the x (back-to-front) axis, the y (lateral, side-to-side) axis, and the z (vertical, up) axis. From a user's view perspective, he or she is looking outward from the center towards an inside surface of the sphere;
2) a projection and rectangular RWP method:
the projection method relates to geometric operational processes used at the content production side for generating two dimensional (2D) video pictures from the sphere signal, the result of stitching of video signals captured by multiple cameras; The RWP method allows building a packed image from the projected image within which some regions in the projected picture are given more pixels in the packed picture in order to improve their visual quality.
3) storage of omnidirectional media and the associated metadata using the ISO Base Media File Format (ISOBMFF);
4) encapsulation, signaling and streaming of omnidirectional media in the dynamic adaptive streaming over HTTP (DASH) or MPEG media transport (MMT); and
5) media profiles and presentation profiles.

The RWP method allows dividing a projected picture, which has a representation format specified by an omnidirectional video projection format, into rectangular regions and applying transformations such as resizing, mirroring or rotation on regions. A packed picture results from applying RWP on the projected picture. However, in the first version of OMAF, RWP can only be defined statically. Static RWP merely allows regions in the packed picture and projected picture to be defined once and remain unchanged for the entire duration of the OMAF application. OMAF is a system standard developed by MPEG.

A frame of a video refers to at least one picture such as a projected picture or a packed pictured. Sometimes, a frame of a video also refers to an audio. In the present disclosure, the frame at least refers to picture, but there is no limit to whether the frame also includes audio.

The projected picture is a picture of an omnidirectional video, and the video may have a format specified by OMAF, which may be regarded as a sphere picture.

Sometimes the projected picture is a picture of a 3D video with a viewing angle less than 360 degrees, accordingly the projected picture may be regarded as a half-sphere picture or a fan-shaped picture as required.

After performing RWP processing on the projected frame of the video, a packed picture with regions is obtained. Parameters can be used for describing the frame and/or the regions of the frame. And according to the object described, the parameters can be classified into frame parameters and region parameters.

The present technical disclosure concerns the possibility to define dynamic RWP in an OMAF application and proposes mechanisms to optimize the signaling of such dynamic RWP.

The first version of OMAF introduced RWP as a tool that allows dividing the projected picture into rectangular regions and then applying transformations such as resizing, mirroring or rotation to regions before packing them into the packed picture. In particular, this allows allocating more pixels to region that matters the most in the projected picture when building the packed picture.

Figure 2:
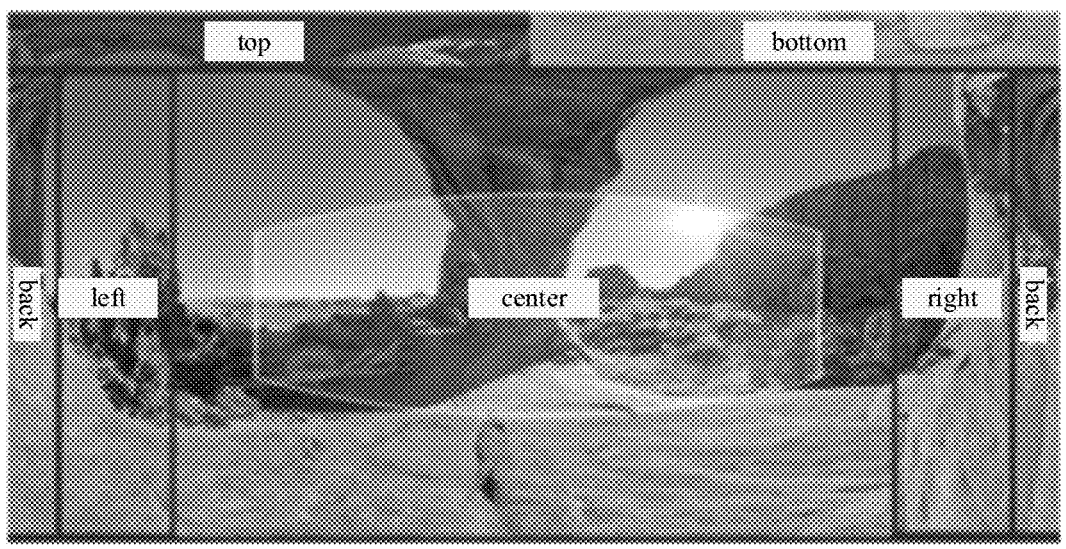
FIG. 2 is an application of RWP to equirectangular projection (ERP) image.

FIG. 2 shows a packed picture in a rectangle, which is divided into several regions, and these regions correspond to the different area or position in the packed picture. In the example given on FIG. 2, RWP is used to distribute more pixels (and therefore give more quality) to the front of the 360 video while moderately reducing the quality of left, right and back regions and drastically reducing the quality of top and bottom regions.

The frame parameters are parameters that describe attributes or situations about an entire frame, such as a size of a projected picture, a size of a packed picture, etc.

The region parameters are parameters that describer a region included in a frame, such as a size of a region, a projected location of a region in a sphere, etc. RWP coding configuration of frames is obtained by at least coding the above two kinds of parameters and then transmitted to a decoder, which can restore the original video by decoding the RWP coding configuration. The size of the picture may include the width of the picture of a frame and/or the height of the picture of a frame.

Packed video frames are classified at least into the dependent frames and the first type of the dependent frames. Parameters of the independent frame need to be coded to generate RWP coding configuration of the independent frame.

The coding on the independent frame here may be full coding, that is, coding of all of the parameters required for decoding the independent frame, and the RWP coding configuration of the independent frame may be called a full RWP coding configuration.

The dependent frame may have some parameters that are the same as the parameters of the independent frames, and then these same parameters can be inherited from the independent frames. This inheritance relationship is described as dependency.

And the dependent frame may have some parameters that differ from the parameters of the independent frame, and then these different parameters refer to the above difference.

Thus, if the RWP coding configuration of the dependent frames are coded according to the difference and dependency between the independent frame and the dependent frame, it means that the parameters reflecting the difference without inheritance relationship can be coded into the RWP coding configuration of the dependent frame, while the parameters inherited from the independent frames can be omitted in the RWP coding configuration of the dependent frames, then the amount of signaling overhead of the dependent frames is reduced and more compact signaling which carries more information by a smaller number of bits is generated.

In some embodiments, the above independent frames include:
 a first type of the independent frames, each of which can be referenced when establishing dependency with any of the dependent frames after the respective one of the first type of the independent frames in the video; and
 a second type of the independent frames, each of which can be referenced when establishing dependency with an immediate next dependent frame after the respective one of the second type of the independent frames in the video.

Each of the first type of the independent frames can establish dependency with the respective one of the dependent frames to be processed. In an actual application, there may be one or more the first type of the independent frames. When a dependent frame is processed, one of the first type of the independent frames may be selected as a reference for establishing dependency with the dependent frame.

The second type of independent frames refer to another kind of independent frame, of which the RWP coding configuration will carry all parameters needed to be decoded. While a difference between the second type of independent frames and the first type of the independent frames is that each of the second type of independent frames is desired to establish dependency with an immediately next dependent frame.

The second type of independent frames may be set in a case where parameters of frames significantly change in a very short period of time.

By classifying independent frames into the above two types, it is able to satisfy requirements for different videos and set coding modes flexibly.

In some embodiments,
  the RWP coding configuration of each of the independent frames has a frame-type flag; and
  the frame-type flag of each of the first type of the independent frames has a first value, and the frame-type flag of each of the second type of the independent frames has a second value.

The second value differs from the first value.

The frame-type flag may be used to distinguish the type of frames with different values. That is to say, different values of the frame-type flag correspond to different types of the indicated frame.

In the present disclosure, the frame-type flag can distinguish the type of the independent frames at least.

In some embodiments, the RWP coding configuration of each of the first type of the independent frames includes: a frame ID assigned to the respective one of the first type of the independent frames.

As a frame ID of the first type of independent frames is set, any of them (frame IDs) may be selected as a reference for a subsequent dependent frame in the video to be coded for indicating the dependency easily. A frame ID may be a frame number of one of the first type of the independent frames in the video or a frame number of each of frames in the video, configured for representing its place in the plurality of the first type of independent frames.

In some embodiments, the RWP coding configuration of each of the first type of the dependent frames includes: a frame ID of the respective one of the first type of the independent frames to be depended on to indicate frames' dependency.

When one of the first type of independent frames is used as a reference for one of the first type of dependent frames, a frame ID needs to be added into the generated RWP coding configuration of the dependent frame to indicate which independent frame is being referred to by the dependent frame.

Figure 3:
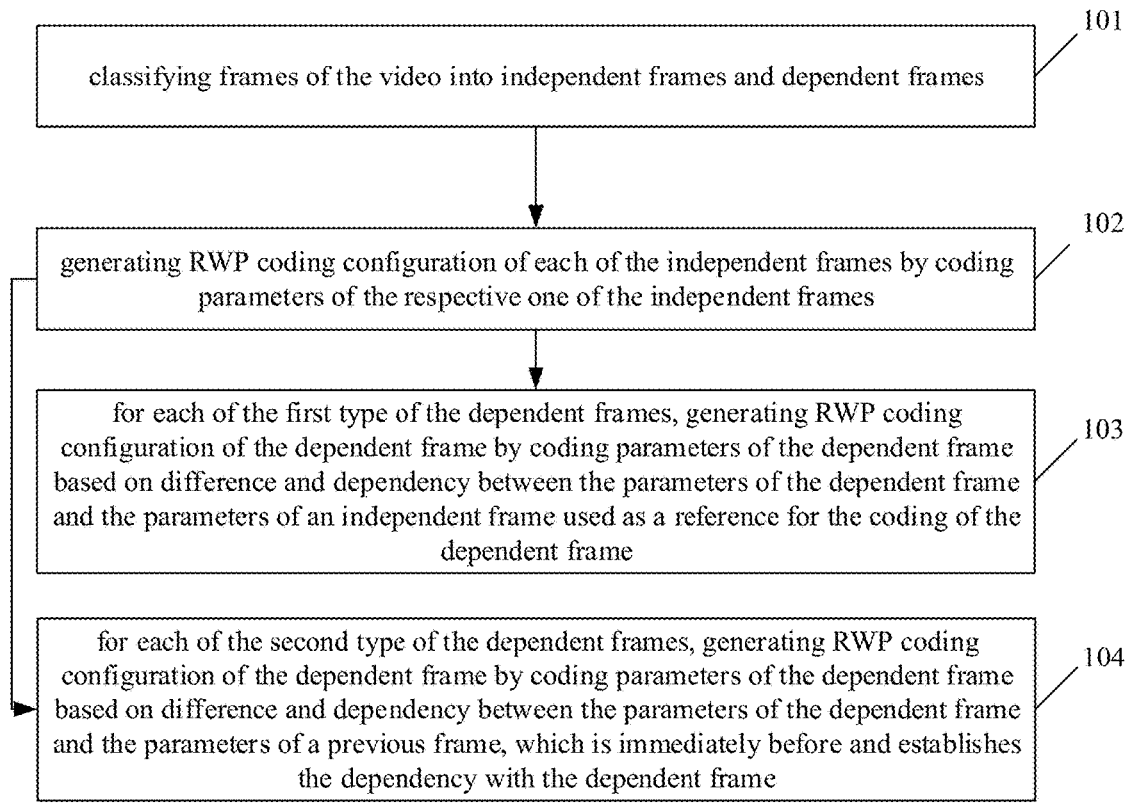
FIG. 3 is a flow chart of a coding method provided by embodiments of the present disclosure.

In some embodiments, as illustrated in FIG. 3, the dependent frames further include a second type of the dependent frames, and the method further include:
  104, for each of the second type of the dependent frames, generating RWP coding configuration of the dependent frame by coding parameters of the dependent frame based on difference and dependency between the parameters of the dependent frame and the parameters of a previous frame, which is immediately before and establishes the dependency with the dependent frame.

Both of the first type of the dependent frames and the second type of the dependent frames are dependent frames, and both of the RWP coding configurations of them can be coded according to the difference and dependency between them and the frame to be depended.

While, the difference between the first type of the dependent frames and the second type of the dependent frames is that each of the second type of the dependent frames depends on an immediately previous frame, and does not care about the type of the immediately previous frame, which may not be limited to the first type of the independent frames or the second type of the independent frames.

For example, its immediately previous frame is a dependent frame, the current second type of dependent frame can also refer to the previous frame, that is, the dependent frame.

That is to say, each of the above second type of the dependent frames can use an immediately previous frame as a reference. Furthermore, because parameters of adjacent projected frames are usually close to each other, signaling overhead may be decreased as much as possible in the coding process of the second type of dependent frames.

In some embodiments, a type of the previous frame can be any one of the first type of the independent frames, the second type of the independent frames, the first type of the dependent frames, and the second type of the dependent frames.

An immediately previous frame of the second type of dependent frame may be an independent frame or a dependent frame, but the type of the immediately previous frame is not necessarily limited in the coding process. When a previous frame immediately before the second type of the dependent frame is an independent frame, the independent frame may be the first type or the second type.

In some embodiments,
  the RWP coding configuration of each of the dependent frames includes a frame-type flag;
  when the frame-type flag has a third value, the third value indicates that the dependent frames are the first type of the dependent frames; and
  when the frame-type flag has a fourth value, the fourth value indicates that the dependent frames are the second type of the dependent frames.

A frame-type flag same as that used for the independent frames is used for distinguishing the type of the above dependent frames. A third value is used to indicate the first type of dependent frames, whereas a fourth value is used to indicate the second type of dependent frames.

The fourth value differs from the third value. Optically, the fourth value differs from both of the first value and the second value, and the third value also differs from both of the first value and the second value.

The frame-type flag can also distinguish the types of the dependent frames, that is to say, the frame-type flag can be used to indicate the type both of the independent frames and dependent frames.

The four values of the frame-type flag may be represented in table 1:

TABLE 1

| Value of the frame-type flag | Meaning corresponding to the value of the frame-type flag |
|---|---|
| 00 | a first type of independent frame, which has a unique ID to indicate the place of the independent frame in a plurality of the first type of independent frames and can establish dependency with any further dependent frame |
| 01 | a second type of independent frame, which does not have an ID and can only establish dependency with the next frame |
| 10 | a first type of dependent frame, which has an ID corresponding to the first type of independent frame, the ID being used to indicate that the dependent frame will establish dependency with which one of the first type of the independent frames |

TABLE 1-continued

| Value of the frame-type flag | Meaning corresponding to the value of the frame-type flag |
|---|---|
| 11 | a second type of dependent frame, which does not have an ID and can only establish dependency with an immediately previous frame |

According to table 1, it can be seen that a frame-type flag with two bits can distinguish four types of the frames in the video clearly and easily.

In some embodiments,
when a dependent frame inherits frame parameters of the frame to be depended on, the RWP coding configuration of the dependent frame includes: at least one frame-inherited flag, which indicates that the frame parameters of the frame to be depended on are inherited; or
when a dependent frame does not inherit frame parameters, the RWP coding configuration of the dependent frame includes: at least one frame-inherited flag, which indicates that the frame parameters of the frame to be depended on are not inherited.

When a dependent frame has frame parameters same as that of a frame to be depended on correspondingly, RWP coding configuration of the dependent frames can inherit frame parameters to be depended on. In this case, a frame-inherited flag is introduced in the RWP coding configuration to indicate whether to inherit frame parameters. Frame parameters are actually parameters of the entire picture of the frame, such as a size of the picture. The size of the picture may include the width of the picture of a frame and/or the height of the picture of a frame.

In some embodiments, the frame-inherited flag includes:
a first type of the frame-inherited flag, which indicates whether a width and a height of the projected picture of the frame to be depended on is inherited or not; and
a second type of the frame-inherited flag, which indicates whether a width and a height of the packed picture of the frame to be depended on is inherited or not.

Frame-inherited flags can also include two types for indicating whether to inherit width and height parameters such as widths, heights, etc. of projected pictures and packed pictures, respectively.

In some embodiments, the method further includes,
when the dependent frame does not inherit the frame parameters, coding the frame parameters into the RWP coding configuration of the dependent frame.

If frame parameters of a dependent frame are not the same as that of a frame to be depended on, the frame parameters of the dependent frame may be coded directly, without inheriting the frame parameters of the frame to be depended on.

In some embodiments, the RWP coding configuration of each of the dependent frames includes: a region-inherited flag, which indicates whether at least one region of the respective frame to be depended on are inherited or not.

Using RWP, a frame may be divided into multiple regions, each of which can be described by one or more region parameters. When region parameters of an independent frame are being coded, parameters required for decoding will be coded into the RWP coding configuration of the independent frames. However, when region parameters of a dependent frame are being coded, regions parameters that differ from that of a frame to be depended on will be coded into the RWP coding configuration of the dependent frames.

Here, a region-inherited flag is set in RWP coding configuration based on regions so as to indicate whether at least one region of an independent frame to be depended on will be inherited by the dependent frame. When all of region parameters of a region of a dependent frame are different from that of a frame to be depended on, region parameters of the frame to be depended on cannot be inherited. At this time, a region-inherited flag is set to have a value indicating the region corresponding to the region-inherited flag is not inherited. When at least one region parameter of a region of a dependent frame is the same as that of a region in a frame to be depended on, at least one region parameter of the frame to be depended on may be inherited. At this time, a region-inherited flag can be set to have a value indicating at least one region will be inherited.

In some embodiments, when the region-inherited flag indicates none region of the respective frame to be depended on is inherited, the RWP coding configuration of the dependent frame includes region parameters required to decode the respective region of the dependent frame.

When all of region parameters of a region of a dependent frame are different from that of a frame to be depended on, a region-inherited flag is set to have a value indicating a region is not inherited, and region parameters of the region corresponding to the region-inherited flag need to be coded in the RWP coding configuration of the dependent frames.

In some embodiments, one frame to be depended on has N regions, one dependent frame has M regions, and N and M are positive integers; and
when an $i^{th}$ region of one of the frames to be depended on has at least one same region parameter as that of a $j^{th}$ region of the respective dependent frame,
the RWP coding configuration of the dependent frame includes:
a region ID of the $j^{th}$ region of the frame to be depended on to indicate regions' dependency, and a parameter-inherited flag to indicate the at least one same region parameter of the $i^{th}$ region of the frame to be depended on is inherited;
wherein, the i is an integer, more than or equal to 0 and less than N, and the j is an integer, greater than or equal to 0 and less than M.

In this case, as a region ID is assigned at least to the first type of the independent frames. Both i and j can be number of a region in the respective frame. Because i may be equal to or not equal to j, then the regions' dependency can be more flexible, and the regions' dependency can be performed in a fixed mode. If the regions' dependency can be more flexible, regions' dependency can be formed between the two most similar regions coming from the independent frame and dependent frame, then more signaling overhead can be reduced.

In some embodiments, one frame to be depended on has N regions, one dependent frame has M regions, and N and M are positive integers; and
when an $i^{th}$ region of one of the frames to be depended on has at least one same region parameter as that of an $i^{th}$ region of the respective dependent frame, the RWP coding configuration of the dependent frame indicates, by a parameter-inherited flag, which of the region parameters of the $i^{th}$ region of the frame to be depended on are inherited, wherein, the i is an integer, more than or equal to 0 and less than N, and less than M.

In this case, the region ID used to mark which region to be dependent on can be omitted. That is to say, even there is no region ID indicating regions' dependency, the above solution can also lead to a successfully regions' dependency execution, as the regions' dependency between regions can be determined in sequence.

When an $i^{th}$ region of one of the frames to be depended on is inherited by an $i^{th}$ region of the respective dependent frame, the RWP coding configuration of the dependent frame indicates, by a parameter-inherited flag, which of the region parameters of the $i^{th}$ region of the frame to be depended on are inherited, wherein, the i is an integer, more than or equal to 0 and less than N, and less than M.

An $i^{th}$ region of a dependent frame establishes dependency with an $i^{th}$ region of a frame to be depended on. When a region of a dependent frame has a regions' dependency with a region in the frame to be depended on, a parameter-inherited flag is configured to indicate which region parameters are to be depended on.

When N is equal to M, each of regions of a dependent frame has dependency with a corresponding region of a frame to be depended on. At this time, regions of the dependent frame can be processed accordingly.

The region parameters include but not limited to at least one of the following region parameters:
  a size of a region, including the width of the region and/or the height of the region;
  a packed type of a region;
  a position of a region, which indicating where the region locates in the packed picture or the projected picture,
  a transform type, including rotating and/or mirroring etc.

In some embodiments, when M is less than N, the RWP coding configuration of the dependent frame further includes: a region-discarded flag, present in N minus M regions parameters, which is configured to indicate discarding of a region, wherein the region is a region in the frame to be depended on, but not referenced by any region in the dependent frame; and
  when M is more than N, the RWP coding configuration of the dependent frame includes region parameters required to decode the last M-N regions of the respective dependent frame.

When N is larger than M, there are redundant regions in a frame to be depended on. A region-discarded flag is set to each of the additional regions. There are neither parameters that are needed to be coded nor parameters that can be inherited in the additional regions. Therefore, the RWP coding configuration of each of the additional regions may only include a region-discarded flag for indicating that there is no regions' dependency with an indicated region-discarded flag.

When N is less than M, a dependent frame has more regions. In processing for an $(N+1)^{th}$ region to an $M^{th}$ region, none of the regions of the frame to be depended on can be referred to, and thus, it is impossible to compare a region from the $(N+1)^{th}$ region to the $M^{th}$ region with any of the regions of the frame to be depended on. The excessive regions in the dependent frame do not have parameters to be inherited, and thus, region parameters of these excessive regions may be coded directly.

In some embodiments, the step of classifying the video frames into the independent frames and the dependent frames includes:
  setting a first frame of the frames to be an independent frame; and
  after the first frame, setting an independent frame in a regular interval of a specified number of the dependent frames; or after the first frame, setting an independent frame based on a stream switching point, and setting the frames except for the independent frames to be the dependent frames.

In the coding process, multiple video frames need to be processed. Because no frame can be depended on for a first projected frame, the first frame needs to be completely coded. That is to say, the first frame is set to be one of the first type of independent frames.

In order to make sure accuracy of coding on a dependent frame, multiple independent frames may be set in a specified number of intervals or time intervals, such as a preset seconds or a preset frames, and each of the independent frames may be completely coded. Alternatively, a location of an independent frame may be determined by a stream switching/access point, so as to ensure there is at least one independent frame that is completed coded when a data stream changes remarkably, and avoid significant difference between a dependent frame and a frame to be depended on.

Figure 4:
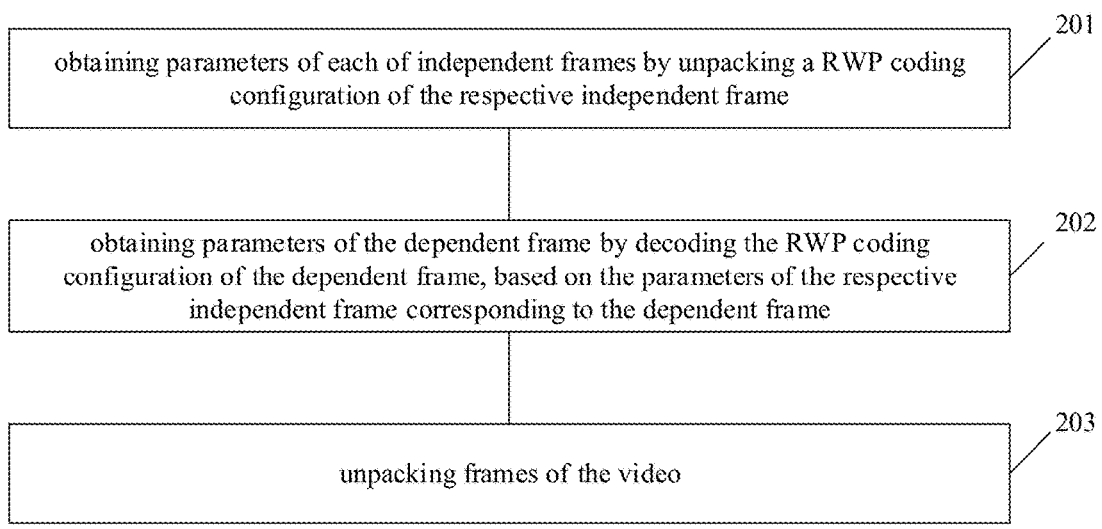
FIG. 4 is a flow chart of a decoding method provided by embodiments of the present disclosure.

Embodiments of the present disclosure further provide a video decoding method. As illustrated in FIG. 4, the method includes:
  201, obtaining parameters of each of independent frames by unpacking a RWP coding configuration of the respective independent frame;
  202, for each of dependent frames, obtaining parameters of the dependent frame by decoding the RWP coding configuration of the dependent frame, based on the parameters of the respective independent frame corresponding to the dependent frame, wherein the dependent frame at least includes a first type of dependent frames; and
  203, unpacking video frames, at least based on the parameters of the independent frames and the parameters of the first type of the dependent frames.

In the decoding process, the obtained RWP coding configuration needs to be unpacked, so as to acquire parameters of independent frames.

Since the RWP coding configuration of the dependent frame are coded according to difference and dependency between itself and the frame to be depended on, and thus, some parameters are written in the RWP coding configuration of the frame to be depended on, then the parameters of the dependent frames should be decoded by combining the RWP coding configuration of the dependent frames and the RWP coding configuration of the frame that is depended on.

The video is unpacked based on the parameters of the independent frames and the parameters of the dependent frames, so as to restore pictures of the original video to be displayed.

Because the RWP coding configuration of the dependent frame is coded based on parameters of the independent frame, much of signaling overhead may be stored, the number of signaling received by a decoder may be reduced as many as possible, thereby decreasing transmission pressure, storing the use of storage space, and realizing the dynamic decoding on RWP coding configuration.

In some embodiments, the step of obtaining parameters of the dependent frame by decoding the RWP coding configuration of the dependent frame, based on the parameters of the respective independent frame corresponding to the dependent frame, includes:
  when a frame-inherited flag in the RWP coding configuration of a dependent frame indicates at least one frame parameter of the respective frame that is depended on is inherited, obtaining the at least one frame parameter of the dependent frame, from the RWP coding configuration of the frame that is depended on; or when the frame-inherited flag in the RWP coding configuration of one dependent frame indicates none of the frame parameter of respective frame that is depended on is inherited, obtaining the frame parameters of the dependent frame, from the RWP coding configuration of the dependent frame.

A frame-inherited flag can be configured to determine whether a current dependent frame inherits frame parameters of a frame that is depended on. When it is determined that the dependent frame inherits the frame parameters of the frame that is depended on, the dependent frame needs to be decoded, at least based on the frame parameters of the frame that is depended on. If the dependent frame does not inherit the frame parameters of the frame that is depended on, the frame parameters of the dependent frame are directly decoded according to the RWP coding configuration of the dependent frame.

As such, it may be recognized, by a frame-inherited flag, whether one frame has at least one same frame parameter as another frame. Therefore, decoding on the frame may be processed based on frame parameters, without the use of an amount of signaling overhead or repeated processes of decoding on same parameters.

The frame parameter includes but is not limited to the width of the projected picture, the height of the projected picture, the width of the packed picture, and the height of the packed picture, etc.

In some embodiments, the step of unpacking video frames further includes:
unpacking video frames further based on the frame parameter obtained.

The above-mentioned frame parameters refer to parameters belonging to each frame of a video. When a video is unpacked, it is required to obtain descriptions corresponding to each frame by unpacking frame parameters. For example, a size of a picture of a frame of a video may be determined by frame parameters. Then, decoding on the frame is continued to obtain relevant parameters of the picture. The size of a region includes the width of the region and/or the height of the region.

In some embodiments, the step of obtaining the at least one frame parameter of the dependent frame, from the RWP coding configuration of the frame that is depended on, includes:
when a first type of the frame-inherited flag in the RWP coding configuration of the dependent frame indicates a height and a width of a projected picture of the frame that is depended on is inherited, obtaining the inherited height and width of the projected picture of the dependent frame, from the RWP coding configuration of the frame that is depended on;
and/or
when a second type of the frame-inherited flag in the RWP coding configuration of the dependent frame indicates a height and a width of a packed picture of the frame that is depended on is inherited, obtaining the inherited height and width of the packed picture of the dependent frame, from the RWP coding configuration of the dependent frame.

The above-mentioned frame parameters may include width parameters and height parameters of projected frames, and may also include width parameters and height parameters of packed frames. In the decoding process, a value or a type of a frame-inherited flag may be configured to determine whether a dependent frame inherits frame parameters of a frame that is depended on and which frame parameters are inherited.

In some embodiments, the method further includes:
when a frame-type flag of one of the independent frames has a first value, storing the RWP coding configuration of the first type of the independent frame; and
storing RWP coding configuration of an immediately previous frame, and
wherein the RWP coding configuration stored is used for obtaining parameters of the dependent frame.

As one of the first type of the dependent frames can depend on any one of the first type of the independent frames, and one of the second type of the dependent frames can depend on an immediately previous frame, and thus it is enough that the decoder can save the first type of the independent frames and the immediately previous frame.

For the first type of independent frames, the frame-type flag has a first value, then the first type of the independent frame can be recognized by the frame-type flag clearly and easily. The immediately previous frame is just a previous frame just before the current frame to be decoded and it can be recognized by decoder without any doubts.

If a frame that is depended on by a dependent frame is an immediately previous frame, decoding on the dependent frame may be processed based on the RWP coding configuration of the previous frame and the RWP coding configuration of the dependent frame that is being decoded. If a frame that is depended on by a dependent frame is one of the first type of the independent frames, decoding on the dependent frame may be processed based on the RWP coding configuration of the independent frame that has been stored and the RWP coding configuration of the dependent frame that is being decoded.

Figure 5:
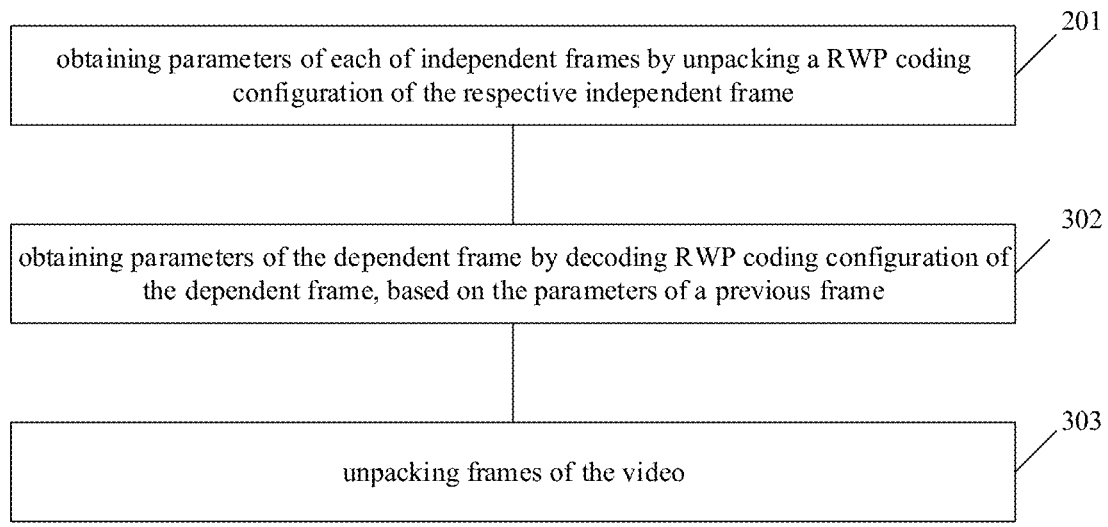
FIG. 5 is a flow chart of a decoding method provided by embodiments of the present disclosure.

In some embodiments, as illustrated in FIG. 5, the step of obtaining parameters of the dependent frame by decoding the RWP coding configuration of the dependent frame, based on the parameters of the respective independent frame corresponding to the dependent frame includes:
302, obtaining parameters of the dependent frame by decoding RWP coding configuration of the dependent frame, based on the parameters of a previous frame, which is immediately before and has the dependency with each of a second type of dependent frames, and
the step of unpacking video frames, further includes:
303, unpacking video frames, further based on the parameters of each of the second type of the dependent frames.

The above-mentioned dependent frame may also be one of the second type of dependent frames, which is a dependent frame that only refers to an immediately previous frame; whereas, one of the first type of dependent frames may refer to any of independent frames.

Therefore, in the decoding process, decoding on a dependent frame is also required to be based on one of RWP coding configuration of the second type of dependent frames as well as RWP coding configuration of the previous frame.

In some embodiments, the previous frame can be any one of the first type of the independent frames, the second type of the independent frames, the first type of the dependent frames, and the second type of the dependent frames.

An immediately previous frame of one of the second type of dependent frames may be any frame type. That is to say, one of the first type of independent frames may have dependency with any further frame, and thus, it may have dependency with an immediately next frame; and one of the second type of independent frames can only have dependency with an immediately next frame, which means one of the second type of independent frames can be a reference of one of the second type of dependent frames; and one of the first type of dependent frames and the second type of dependent frames may also has dependency with one of the second type of dependent frames.

In some embodiments, the method further includes:
when a frame-type flag of the RWP coding configuration of the respective one of the dependent frames has a third value, determining which of the first type of the independent frames is depended, by matching a frame ID in the RWP coding configuration of the first type of independent frame stored, with a frame ID indicating frame that is depended on carried in the RWP coding configuration of the respective one of the dependent frames;
and/or
when a frame-type flag of the RWP coding configuration of the respective one of the dependent frames has a fourth value, determining that the immediately previous frame before the dependent frame is depended.

A frame-type flag of each of the second type of the dependent frames has a third value. When a dependent frame having a frame-type flag with a third value is being decoded, a respective one of the first type of independent frames that is depended on by the dependent frame needs to be determined, by an frame ID in the RWP coding configuration of the dependent frame which is stored before the decoding of the current dependent frame. The first type of independent frames is distinguished by a frame ID, and thus, the fame ID in the RWP coding configuration of the dependent frame may correspond to the frame ID of the respective one of the first type of the independent frames.

A frame-type flag of each of the second type of the dependent frames has a fourth value. When a dependent frame having a frame-type flag with a fourth value is decoded, decoding on the dependent frame may be processed directly based on the RWP coding configuration of the dependent frame and the RWP coding configuration of an immediately previous frame, so as to obtain parameters of the dependent frame and restore pictures of the video at the end.

In some embodiments, the step of obtaining parameters of the dependent frame by decoding the RWP coding configuration of the dependent frame, based on the parameters of the respective independent frame corresponding to the dependent frame, includes:
when a region-inherited flag in the RWP coding configuration of a dependent frame indicates at least one region of the frame that is depended on are inherited, obtaining the region parameters of the inherited region, based on the RWP coding configuration of the dependent frame and the RWP coding configuration of the respective frame that is depended on.

For each frame, after decoding on frame parameters is completed, the process proceeds to decoding on region parameters. When a dependent frame is being decoded, it is determined, by a region-inherited flag, whether a region of a frame that is depended on is inherited. If it is determined that a region of a frame that is depended on is inherited, it means that in the RWP coding configuration of the dependent frame, at least one region parameter is inherited from the frame that is depended on.

Specifically, when a region-inherited flag indicates that a region does not have region parameters that are inherited, the region may be directly decoded; whereas, when a region-inherited flag indicates a region has region parameters that are inherited, the region needs to be decoded based on the RWP coding configuration of the frame that is depended on and the RWP coding configuration of the current dependent frame, so as to obtain region parameters of the region.

When a region that has region parameters to be inherited is being decoded, the decoding may be processed by determining whether region parameters are to be inherited. Therefore, efficiency of the decoding process may be improved.

In some embodiments, the step of obtaining the region parameters of the inherited region, based on the RWP coding configuration of the dependent frame and the RWP coding configuration of the respective frame that is depended on, includes:
when a parameter-inherited flag in the RWP coding configuration of the dependent frame indicates at least one region parameter corresponding to the parameter-inherited flag, of the frame that is depended on is inherited, obtaining the inherited region parameters from the RWP coding configuration of the frame that is depended on,
and/or
when a parameter-inherited flag in the RWP coding configuration of the dependent frame indicates none region parameter corresponding to the parameter-inherited flag, of the frame that is depended on is inherited, obtaining the inherited region parameters from the RWP coding configuration of the dependent frame.

For a dependent frame, determination for regions' dependency includes two types: one is that a part of region parameters of the inherited region may be inherited from the frame that is depended on, and the other part of the region parameters of the inherited region may be different from that of the frame that is depended on, which are obtained by decoding the RWP coding configuration of the dependent frame directly. The other is that all region parameters of the inherited region are inherited from the frame that is depended on.

Therefore, for an inherited region of the dependent frame, it is also required to recognize whether each region parameter is inherited from a frame that is depended on by a parameter-inherited flag. If a region parameter is inherited from the frame that is depended on, the region parameter needs to be decoded based on the frame that is depended on; otherwise, the region parameter is directly decoded based on the RWP coding configuration of the dependent frame that is being coded.

In some embodiments, before the step of the obtaining the region parameters, the method further includes:
determining which region in the frame that is depended on is inherited, according to a region ID indicating regions' dependency, in the RWP coding configuration of the dependent frame;
or
if there is no region ID indicating regions' dependency, determining an $m^{th}$ region in the frame that is depended on is inherited, when the region-inherited flag of an $m^{th}$ region in the dependent frame indicates having regions' dependency, wherein m is zero or a positive integer, and m is less than or equal to M−1, M being a smaller of a total number of regions in the dependent frame and a total number of regions in the frame that is depended on.

The determination for dependency between a region of a dependent frame and a region of a frame that is depended on may be implemented in two ways. If each of regions carries a region ID to indicate which two regions have a dependency relationship, the regions' dependency between regions can be directly determined by a region ID when a region-inherited flag indicates having a regions' dependency.

Alternatively, if there is no region ID for indicating dependency between regions, the regions' dependency between regions is determined according to the number of the current region when the region-inherited flag indicating having the $p^{th}$ region. For example, if the current region is the $p^{th}$ region of the dependent frame, the region-inherited flag of the $p^{th}$ region having a regions' dependency, it means that the $p^{th}$ region of the dependent frame has a dependency with the $p^{th}$ region of the frame that is depended on.

In some embodiments, the method further includes:
when the RWP coding configuration of one of the dependent frames further includes a region-discarded flag, skipping comparing a region in the frame that is depended on indicated by the region-discarded flag with a region in the dependent frame.

The number of regions of a dependent frame may be different from that of a frame that is depended on, and thus, in the coding process, if the number of regions of a frame to be depended on is larger than that of a dependent frame; additional regions are added into RWP coding configuration of the dependent frame. However, at this time, none of region parameters are inherited, and coding on the region parameters is not processed, either. Meanwhile, a region-discarded flag is added to mark the added region. Therefore, in the decoding process, when the decoding process proceeds to a region with a region-discarded flag, decoding on the region is skipped, and the process proceeds to the next region.

As such, unnecessary region comparison may be excluded rapidly, thereby improving efficiency of decoding.

Figure 6:
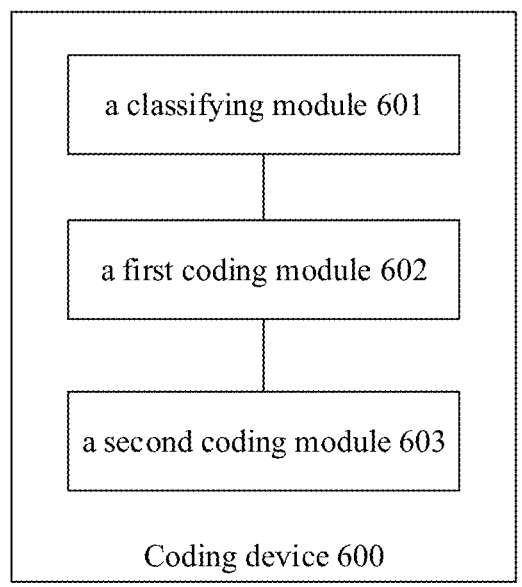
FIG. 6 is a structural diagram of a coding device provided by embodiments of the present disclosure.

Embodiments of the present disclosure further provide a video coding device. As illustrated in FIG. 6, the coding device 600 includes:
a classifying module 601, configured for classifying video frames into independent frames and dependent frames, which include a first type of the dependent frames;
a first coding module 602, configured to generate RWP coding configuration of each of the independent frames by coding parameters of the respective one of the independent frames, wherein the RWP coding configuration of the independent frames includes the parameters to be unpacked to restore the video; and
a second coding module 603, configured to generate RWP coding configuration of the dependent frame by coding parameters of the dependent frame based on difference and dependency between the parameters of the dependent frame and the parameters of an independent frame used as a reference for the coding of the dependent frame, for each of the first type of the dependent frames.

In some embodiments, the independent frames include:
a first type of the independent frames, each of which can be referenced when establishing dependency with any of the dependent frames after the respective one of the first type of the independent frames in the video; and
a second type of the independent frames, each of which can be referenced when establishing dependency with an immediate next dependent frame after the respective one of the second type of the independent frames in the video.

In some embodiments, the RWP coding configuration of each of the independent frames has a frame-type flag; and the frame-type flag of each of the first type of the independent frames has a first value, and the frame-type flag of each of the second type of the independent frames has a second value.

In some embodiments, the RWP coding configuration of each of the first type of the independent frames includes: a frame ID assigned to the respective one of the first type of the independent frames.

The RWP coding configuration of each of the first type of the dependent frames includes: a frame ID of the respective one of the first type of the independent frames to be depended on to indicate frames' dependency.

In some embodiments, the dependent frames further include a second type of the dependent frames, and the device further includes:
a third coding module, configured to generate RWP coding configuration of the dependent frame by coding parameters of the dependent frame based on difference and dependency between the parameters of the dependent frame and the parameters of a previous frame, which is immediately before and establishes the dependency with the dependent frame, for each of the second type of the dependent frames.

In some embodiments, a type of the previous frame can be any one of the first type of the independent frames, the second type of the independent frames, the first type of the dependent frames, and the second type of the dependent frames.

In some embodiments, the RWP coding configuration of each of the dependent frames includes a frame-type flag;
when the frame-type flag has a third value, the third value indicates that the dependent frames are the first type of the dependent frames; and
when the frame-type flag has a fourth value, the fourth value indicates that the dependent frames are the second type of the dependent frames.

In some embodiments, when a dependent frame inherits frame parameters of the frame to be depended on, the RWP coding configuration of the dependent frame includes: at least one frame-inherited flag, which indicates that the frame parameters of the frame to be depended on are inherited; or
when a dependent frame does not inherit frame parameters, the RWP coding configuration of the dependent frame includes: at least one frame-inherited flag, which indicates that the frame parameters of the frame to be depended on are not inherited.

In some embodiments, the frame-inherited flag includes:
a first type of the frame-inherited flag, which indicates whether a height and a width of the projected picture of the frame to be depended on is inherited or not; and
a second type of the frame-inherited flag, which indicates whether a height and a width of the packed picture of the frame to be depended on is inherited or not.

In some embodiments, the device further includes,
a fourth coding module, configured to code the frame parameters into the RWP coding configuration of the dependent frame, when the dependent frame does not inherit the frame parameters.

In some embodiments, the RWP coding configuration of each of the dependent frames includes: a region-inherited flag, which indicates whether at least part of regions of the respective frame to be depended on are inherited or not.

In some embodiments, when the region-inherited flag indicates none region of the respective frame to be depended on is inherited, the RWP coding configuration of the dependent frame includes region parameters required to decoding the respective region of the dependent frame.

In some embodiments, one frame to be depended on has N regions, one dependent frame has M regions, and N and M are positive integers; and when an $i^{th}$ region of one of the frames to be depended on has at least one same region parameter as that of a jth region of the respective dependent frame,
the RWP coding configuration of the dependent frame includes:
a region ID of the jth region of the frame to be depended on to indicate regions' dependency, and a parameter-inherited flag to indicated the at least one same region parameter of the $i^{th}$ region of the frame to be depended on is inherited;
wherein, the i is an integer, more than or equal to 0 and less than N, and the j is an integer, more than or equal to 0 and less than M.

In some embodiments, one frame to be depended on has N regions, one dependent frame has M regions, and N and M are positive integers; and when an $i^{th}$ region of one of the frames to be depended on has at least one same region parameter as that of an $i^{th}$ region of the respective dependent frame, the RWP coding configuration of the dependent frame indicates, by a parameter-inherited flag, which of the region parameters of the $i^{th}$ region of the frame to be depended on are inherited, wherein, the i is an integer, more than or equal to 0 and less than N, and less than M.

In some embodiments, when M is less than N, the RWP coding configuration of the dependent frame further includes: a region-discarded flag, present in N–M regions parameters, which is configured to indicate discarding of a region, wherein the region is a region in the frame to be depended on, but not referenced by any region in the dependent frame; and when M is more than N, the RWP coding configuration of the dependent frame includes parameters required to decoding the last M-N regions of the respective dependent frame.

In some embodiments, the classifying module includes:
a first setting submodule, configured to set a first frame of the frames to be an independent frame; and
a second setting submodule, after the first frame, configured to set an independent frame in a regular interval of a specified number of the dependent frames; or
a third setting submodule, after the first frame, configured to set an independent frame based on a stream switching point, and setting the frames except for the independent frames to be the dependent frames.

Figure 7:
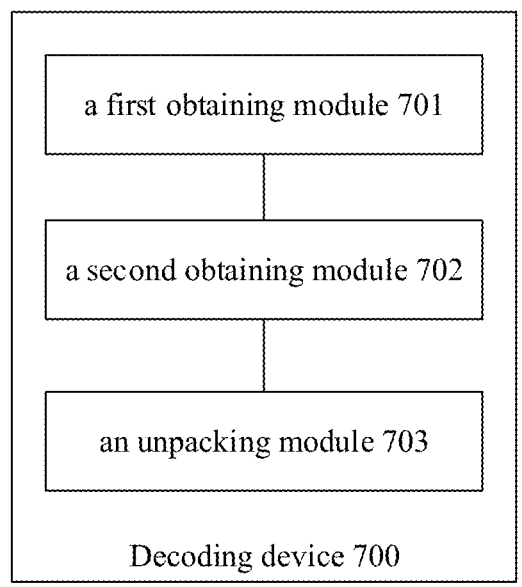
FIG. 7 is a structural diagram of a decoding device provided by embodiments of the present disclosure.

Embodiments of the present disclosure further provide a video decoding device. As illustrated in FIG. 7, the decoding device 700 includes:
a first obtaining module 701, configured to obtain parameters of each of independent frames by unpacking a RWP coding configuration of the respective independent frame;
a second obtaining module 702, for each dependent frames, configured to obtain parameters of the dependent frame by decoding the RWP coding configuration of the dependent frame, based on the parameters of the respective independent frame corresponding to the dependent frame, wherein the dependent frame at least includes a first type dependent frames; and
an unpacking module 703, configured to unpack video frames, at least based on the parameters of the independent frames and the parameters of the first type of the dependent frames.

In some embodiments, the second obtaining module, includes:
a first obtaining submodule, configured to obtain the at least one frame parameter of the dependent frame, from the RWP coding configuration of the frame that is depended on, when a frame-inherited flag in the RWP coding configuration of a dependent frame indicates at least one frame parameter of the respective frame that is depended on is inherited; or
a second obtaining submodule, configured to obtain the frame parameters of the dependent frame, from the RWP coding configuration of the dependent frame, when the frame-inherited flag in the RWP coding configuration of one dependent frame indicates none of the frame parameter of respective frame that is depended on is inherited.

In some embodiments, the unpacking module further configured to unpack video frames further based on the frame parameter obtained.

In some embodiments, the first obtaining submodule, further configured to,
obtain the inherited height and width of the projected picture of the dependent frame, from the RWP coding configuration of the frame that is depended on, when a first type of the frame-inherited flag in the RWP coding configuration of the dependent frame indicates a height and a width of a projected picture of the frame that is depended on is inherited;
and/or
when a second type of the frame-inherited flag in the RWP coding configuration of the dependent frame indicates a height and a width of a packed picture of the frame that is depended on is inherited, obtaining the inherited height and width of the packed picture of the dependent frame, from the RWP coding configuration of the dependent frame.

In some embodiments, the device further includes:
a first storing module, configured to store the RWP coding configuration of the first type of the independent frame, when a frame-type flag of one of the independent frames has a first value; and
a second storing module, configured to storing RWP coding configuration of an immediately previous frame, the immediately previous frame includes a second type of the independent frame, and
wherein the RWP coding configuration stored is used for obtaining parameters of the dependent frame.

In some embodiments, the second obtaining module includes:
a third obtaining submodule, configured to obtain parameters of the dependent frame by decoding RWP coding configuration of the dependent frame, based on the parameters of a previous frame, which is immediately before and has the dependency with each of a second type of dependent frames, and
the unpacking module, configured to unpack video frames, further based on the parameters of each of the second type of the dependent frames.

In some embodiments, the previous frame can be any one of the first type of the independent frames, the second type of the independent frames, the first type of the dependent frames, and the second type of the dependent frames.

In some embodiments, the device further includes:
a first determining module, configured to determine which of the first type of the independent frames is depended, by matching a frame ID stored in the RWP coding configuration of the first type of independent frame, with a frame ID indicating frame that is depended on carried in the RWP coding configuration of the respective one of the dependent frames, when a frame-type flag of the RWP coding configuration of the respective one of the dependent frames has a third value;

and/or a second determining module, configured to determine that the immediately previous frame before the dependent frame is depended, when a frame-type flag of the RWP coding configuration of the respective one of the dependent frames has a fourth value.

In some embodiments, the second obtaining module, includes:

a fourth obtaining submodule, configured to obtain the region parameters of the inherited region, based on the RWP coding configuration of the dependent frame and the RWP coding configuration of the respective frame that is depended on, when a region-inherited flag in the RWP coding configuration of a dependent frame indicates at least one region of the frame that is depended on are inherited.

In some embodiments, the fourth obtaining submodule, further configured to:

obtain the inherited region parameters from the RWP coding configuration of the frame that is depended on, when a parameter-inherited flag in the RWP coding configuration of the dependent frame indicates at least one region parameter corresponding to the parameter-inherited flag, of the frame that is depended on is inherited, and/or when a parameter-inherited flag in the RWP coding configuration of the dependent frame indicates none region parameter corresponding to the parameter-inherited flag, of the frame that is depended on is inherited, obtaining the inherited region parameters from the RWP coding configuration of the dependent frame.

In some embodiments, the device further includes:

a third determining module, configured to determine which region in the frame that is depended on is inherited, according to a region ID indicating regions' dependency, in the RWP coding configuration of the dependent frame;

or a fourth determining module, configured to determine an $m^{th}$ region in the frame that is depended on is inherited, if there is no region ID indicating regions' dependency, when the region-inherited flag of an $m^{th}$ region in the dependent frame indicates having regions' dependency, wherein the m is zero or a positive integer, and the m is less than or equal to M−1, the M is a smaller one between a total number of regions in the dependent frame and a total number of regions in the frame that is depended on.

In some embodiments, the device further includes:

a stopping module, configured to skip comparing a region in the frame that is depended on indicated by the region-discarded flag with a region in the dependent frame when the RWP coding configuration of each of the dependent frames further includes a region-discarded flag.

The description of the above device embodiments is similar to the description of the above method embodiments, and has similar advantages as that of the method embodiments. For technical details not disclosed in the device embodiments of the present disclosure, please refer to the description of the method embodiments of the present disclosure.

It is to be noted that, in the embodiment of the present disclosure, if the above method is implemented in the form of a software function module and sold or used as a stand-alone product, it may also be stored in a computer storage medium. Based on such understanding, the technical solution of the embodiments of the present disclosure may be embodied in the form of a software product in essence or in the form of a software product stored in a storage medium, including a plurality of instructions. Either an encoding or decoding device performs all or part of the method of the various embodiments of the present disclosure. The foregoing storage medium includes various media that can store program codes, such as a USB flash drive, a mobile hard disk, a read only memory (ROM), a magnetic disk, or an optical disk. Thus, embodiments of the invention are not limited to any specific combination of hardware and software.

Correspondingly, embodiments of the present disclosure provide a terminal, including a memory and a processor, where the memory stores a computer program executable on a processor, and when the processor executes the program, the steps of the method provided in the foregoing embodiments are implemented Correspondingly, embodiments of the present disclosure provide a computer readable storage medium, where a computer program is stored, and when the computer program is executed by a processor, the steps of the method provided by the foregoing embodiment are implemented.

It is to be noted here that the description of the above storage medium and device embodiments is similar to the description of the above method embodiments, and has similar advantages as the method embodiments. For technical details not disclosed in the storage medium and device embodiments of the present disclosure, please refer to the description of the method embodiments of the present disclosure.

Figure 8:
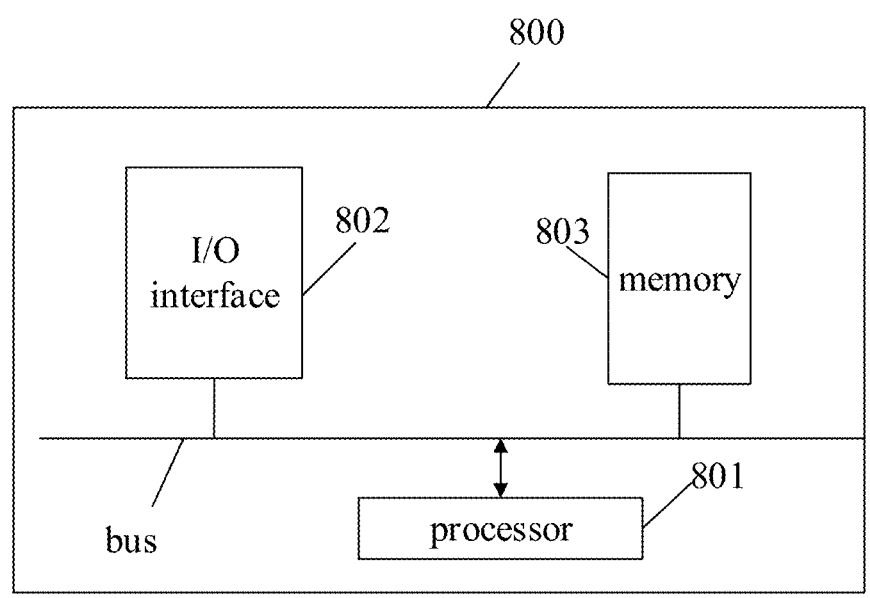
FIG. 8 is a schematic diagram of a hardware entity of a coding or decoding device provided by embodiments of the present disclosure.

It is to be noted that FIG. 8 is a schematic diagram of a hardware entity of a coding or decoding device according to an embodiment of the present disclosure. As illustrated in FIG. 8, the hardware entity of the computer device 800 includes: a processor 801, an I/O interface 802, and a memory 803.

The processor 801 typically controls the overall operation of the coding or decoding device 800.

The I/O interface 802 can enable a coding or decoding device to communicate with other terminals or servers over a network.

The memory 803 is configured to store instructions and applications executable by the processor 801, and may also cache data to be processed or processed by the processor 801 and various modules in the coding or decoding device 800 (e.g., image data, audio data, voice communication data, and Video communication data) can be realized by flash memory (FLASH) or random access memory (RAM).

It is to be understood that the phrase "one embodiment" or "an embodiment" as used throughout the specification means that a particular feature, structure, or characteristic relating to an embodiment is included in at least one embodiment of the disclosure. Therefore, "in one embodiment" or "in an embodiment", which is used throughout the specification, does not necessarily mean the same embodiment. In addition, these particular features, structures, or characteristics may be combined in any suitable manner in one or more embodiments. It is to be understood that, in various embodiments of the present disclosure, the size of the sequence numbers of the above processes does not mean the order of execution, and the order of execution of each process should be determined by its function and internal logic, and should not be limited to the embodiments of the present disclosure. The serial numbers of the embodiments of the present disclosure are merely for the description, and do not represent the advantages and disadvantages of the embodiments.

It is to be understood that the term "includes", "including", or any other variants thereof, is intended to encompass a non-exclusive inclusion, such that a process, method, article, or device including a series of elements includes those elements. It also includes other elements that are not explicitly listed, or elements that are inherent to such a process, method, article, or device. An element that is defined by the phrase "including a . . . " does not exclude the presence of additional equivalent elements in the process, method, item, or device that includes the element.

In the several embodiments provided by the present disclosure, it is to be understood that the disclosed apparatus and method may be implemented in other manners. The device embodiments described above are only schematic. For example, the division of the modules is only a logical function division. In actual implementation, there may be another division manner, for example, multiple modules or components may be combined, or may be integrated into another system, or some features may be ignored or not executed. In addition, the coupling, or direct coupling, or communication connection of the components shown or discussed may be indirect coupling or communication connection through some interfaces, devices or modules, and may be electrical, mechanical or other forms.

The modules described above as separate components may or may not be physically separated, and the components displayed as modules may or may not be physical modules; they may be located in one place or distributed to multiple network modules; some or all of the modules may be selected according to actual needs to achieve the purpose of the solutions of the embodiments.

In addition, each functional module in each embodiment of the present disclosure may be integrated into one processing module, or each module may be separately used as one module, or two or more modules may be integrated into one module; the module can be implemented in the form of hardware or in the form of hardware plus software function modules.

It will be understood by those skilled in the art that all or part of the steps of implementing the foregoing method embodiments may be performed by hardware related to program instructions. The foregoing program may be stored in a computer storage medium, and when executed, the program includes the foregoing steps of the method embodiment; and the foregoing storage medium includes: a removable storage device, a read only memory (ROM), a magnetic disk, or an optical disk, and the like, which can store program codes.

Alternatively, the above-described integrated unit of the present disclosure may be stored in a computer storage medium if it is implemented in the form of a software function module and sold or used as a standalone product. Based on such understanding, the technical solution of the embodiments of the present disclosure may be embodied in the form of a software product in essence or in the form of a software product stored in a storage medium, including a plurality of instructions. A coding or decoding device is caused to perform all or part of the method of the various embodiments of the present disclosure. The foregoing storage medium includes various media that can store program codes, such as a mobile storage device, a ROM, a magnetic disk, or an optical disk.

The above is only the embodiments of the present disclosure, but the scope of the present disclosure is not limited thereto, and any person skilled in the art can easily think of changes or substitutions within the technical scope disclosed by the present disclosure. It is intended to be covered by the scope of the disclosure. Therefore, the scope of the disclosure should be determined by the scope of the appended claims.

The invention claimed is:

1. A video coding method, comprising:
    classifying video frames into independent frames and dependent frames, wherein the dependent frames comprise a first type of the dependent frames;
    generating region wise packing (RWP) coding configuration of each of the independent frames by coding parameters of the respective one of the independent frames, wherein the RWP coding configuration of the independent frames comprises the parameters to be unpacked to restore the video; and
    for each of the first type of the dependent frames, generating RWP coding configuration of the dependent frame by coding parameters of the dependent frame based on difference and dependency between the parameters of the dependent frame and the parameters of an independent frame used as a reference for the coding of the dependent frame; wherein the dependency indicates that the dependent frame has at least one parameter the same as at least one parameter of the independent frame.

2. The method according to claim 1, wherein the independent frames comprise:
    a first type of the independent frames, each of which can be referenced when establishing dependency with any of the dependent frames after the respective one of the first type of the independent frames in the video; and
    a second type of the independent frames, each of which can be referenced when establishing dependency with an immediate next dependent frame after the respective one of the second type of the independent frames in the video.

3. The method according to claim 2, wherein
    the RWP coding configuration of each of the independent frames has a frame-type flag; and
    the frame-type flag of each of the first type of the independent frames has a first value, and the frame-type flag of each of the second type of the independent frames has a second value,
    wherein the RWP coding configuration of each of the first type of the independent frames comprises: a frame identity (ID) assigned to the respective one of the first type of the independent frames, or
    wherein the RWP coding configuration of each of the first type of the dependent frames comprises: a frame ID of the respective one of the first type of the independent frames to be depended on to indicate frames' dependency.

4. The method according to claim 2, wherein the dependent frames further comprise a second type of the dependent frames, and the method further comprises:
    for each of the second type of the dependent frames, generating RWP coding configuration of the dependent frame by coding parameters of the dependent frame based on difference and dependency between the parameters of the dependent frame and the parameters of a previous frame, which is immediately before and establishes the dependency with the dependent frame.

5. The method according to claim 4, wherein a type of the previous frame can be any one of the first type of the independent frames, the second type of the independent frames, the first type of the dependent frames, and the second type of the dependent frames, wherein
the RWP coding configuration of each of the dependent frames comprises a frame-type flag;
when the frame-type flag has a third value, the third value indicates that the dependent frames are the first type of the dependent frames; and
when the frame-type flag has a fourth value, the fourth value indicates that the dependent frames are the second type of the dependent frames.

6. The method according to claim 1, wherein
when a dependent frame inherits frame parameters of the frame to be depended on, the RWP coding configuration of the dependent frame comprises: at least one frame-inherited flag, which indicates that the frame parameters of the frame to be depended on are inherited; or
when a dependent frame does not inherit frame parameters, the RWP coding configuration of the dependent frame comprises: at least one frame-inherited flag, which indicates that the frame parameters of the frame to be depended on are not inherited.

7. The method according to claim 6, wherein the frame-inherited flag comprises:
a first type of the frame-inherited flag, which indicates whether a height and a width of the projected picture of the frame to be depended on is inherited or not; and
a second type of the frame-inherited flag, which indicates whether a height and a width of the packed picture of the frame to be depended on is inherited or not.

8. The method according to claim 6, wherein the method further comprises,
when the dependent frame does not inherit the frame parameters, coding the frame parameters into the RWP coding configuration of the dependent frame.

9. The method according to claim 1, wherein the RWP coding configuration of each of the dependent frames comprises: a region-inherited flag, which indicates whether at least part of regions of the respective frame to be depended on are inherited or not.

10. The method according to claim 9, wherein when the region-inherited flag indicates none region of the respective frame to be depended on is inherited, the RWP coding configuration of the dependent frame comprises region parameters required to decoding the respective region of the dependent frame,
wherein one frame to be depended on has N regions, one dependent frame has M regions, and N and M are positive integers; and
in response to determining that an $i^{th}$ region of one of the frames to be depended on has at least one same region parameter as that of a $j^{th}$ region of the respective dependent frame,
the RWP coding configuration of the dependent frame comprises:
a region ID of the $j^{th}$ region of the frame to be depended on to indicate regions' dependency, and a parameter-inherited flag to indicated the at least one same region parameter of the $i^{th}$ region of the frame to be depended on is inherited;
wherein, the i is an integer, more than or equal to 0 and less than N, and the j is an integer, more than or equal to 0 and less than M,
or
wherein one frame to be depended on has N regions, one dependent frame has M regions, and N and M are positive integers; and
in response to determining that an $i^{th}$ region of one of the frames to be depended on has at least one same region parameter as that of an $i^{th}$ region of the respective dependent frame, the RWP coding configuration of the dependent frame indicates, by a parameter-inherited flag, which of the region parameters of the $i^{th}$ region of the frame to be depended on are inherited, wherein, the i is an integer, more than or equal to 0 and less than N, and less than M,
in response to determining that M is less than N, the RWP coding configuration of the dependent frame further comprises: a region-discarded flag, present in N-M regions parameters, which is configured to indicate discarding of a region, wherein the region is a region in the frame to be depended on, but not referenced by any region in the dependent frame; and
in response to determining that M is more than N, the RWP coding configuration of the dependent frame comprises region parameters required to decoding the last M-N regions of the respective dependent frame.

11. The method according to claim 1, wherein
the step of classifying the video frames into the independent frames and the dependent frames comprises:
setting a first frame of the frames to be an independent frame; and
after the first frame, setting an independent frame in a regular interval of a specified number of the dependent frames; or
after the first frame, setting an independent frame based on a stream switching point, and setting the frames except for the independent frames to be the dependent frames.

12. A video decoding method, comprising:
obtaining parameters of each of independent frames by unpacking a region wise packing (RWP) coding configuration of the respective independent frame;
for each dependent frame, obtaining parameters of the dependent frame by decoding RWP coding configuration of the dependent frame, based on the parameters of the respective independent frame corresponding to the dependent frame, wherein the dependent frame at least includes a first type of dependent frames; and
unpacking video frames, at least based on the parameters of the independent frames and the parameters of the first type of the dependent frames.

13. The method according to claim 12, wherein the step of obtaining parameters of the dependent frame by decoding the RWP coding configuration of the dependent frame, based on the parameters of the respective independent frame corresponding to the dependent frame, comprises:
when a frame-inherited flag in the RWP coding configuration of a dependent frame indicates at least one frame parameter of the respective frame that is depended on is inherited, obtaining the at least one frame parameter of the dependent frame, from the RWP coding configuration of the frame that is depended on; or
when the frame-inherited flag in the RWP coding configuration of one dependent frame indicates none of the frame parameter of respective frame that is depended on is inherited, obtaining the frame parameters of the dependent frame, from the RWP coding configuration of the dependent frame.

14. The method according to claim 13, wherein the step of unpacking video frames further comprises:
unpacking video frames further based on the frame parameter obtained; wherein the step of obtaining the at least one frame parameter of the dependent frame, from the RWP coding configuration of the frame that is depended on, comprises:
when a first type of the frame-inherited flag in the RWP coding configuration of the dependent frame indicates a height and a width of a projected picture of the frame that is depended on is inherited, obtaining the inherited height and width of the projected picture of the dependent frame, from the RWP coding configuration of the frame that is depended on;
and/or
when a second type of the frame-inherited flag in the RWP coding configuration of the dependent frame indicates a height and a width of a packed picture of the frame that is depended on is inherited, obtaining the inherited height and width of the packed picture of the dependent frame, from the RWP coding configuration of the dependent frame.

15. The method according to claim 12, wherein the method further comprises:
when a frame-type flag of one of the independent frames has a first value, storing the RWP coding configuration of the first type of the independent frame; and
storing RWP coding configuration of an immediately previous frame, and
wherein the RWP coding configuration stored is used for obtaining parameters of the dependent frame.

16. The method according to claim 15, wherein the step of obtaining parameters of the dependent frame by decoding the RWP coding configuration of the dependent frame, based on the parameters of the respective independent frame corresponding to the dependent frame comprises:
obtaining parameters of the dependent frame by decoding RWP coding configuration of the dependent frame, based on the parameters of a previous frame, which is immediately before and has the dependency with each of a second type of dependent frames, and
the step of unpacking video frames, further comprises:
unpacking video frames, further based on the parameters of each of the second type of the dependent frames,
wherein the previous frame can be any one of the first type of the independent frames, the second type of the independent frames, the first type of the dependent frames, and the second type of the dependent frames;
wherein the method further comprises:
when a frame-type flag of the RWP coding configuration of the respective one of the dependent frames has a third value, determining which of the first type of the independent frames is depended, by matching a frame identity (ID) saved in the RWP coding configuration of the first type of independent frame stored, with a frame ID indicating frame that is depended on carried in the RWP coding configuration of the respective one of the dependent frames;
and/or
when a frame-type flag of the RWP coding configuration of the respective one of the dependent frames has a fourth value, determining that the immediately previous frame before the dependent frame is depended.

17. The method according to claim 12, wherein
the step of obtaining parameters of the dependent frame by decoding the RWP coding configuration of the dependent frame, based on the parameters of the respective independent frame corresponding to the dependent frame, comprises:
when a region-inherited flag in the RWP coding configuration of a dependent frame indicates at least one region of the frame that is depended on are inherited, obtaining the region parameters of the inherited region, based on the RWP coding configuration of the dependent frame and the RWP coding configuration of the respective frame that is depended on.

18. The method according to claim 17, wherein the step of obtaining the region parameters of the inherited region, based on the RWP coding configuration of the dependent frame and the RWP coding configuration of the respective frame that is depended on, comprises:
when a parameter-inherited flag in the RWP coding configuration of the dependent frame indicates at least one region parameter corresponding to the parameter-inherited flag, of the frame that is depended on is inherited, obtaining the inherited region parameters from the RWP coding configuration of the frame that is depended on,
and/or
when a parameter-inherited flag in the RWP coding configuration of the dependent frame indicates none region parameter corresponding to the parameter-inherited flag, of the frame that is depended on is inherited, obtaining the inherited region parameters from the RWP coding configuration of the dependent frame,
wherein before the step of the obtaining the region parameters, the method further comprises:
determining which region in the frame that is depended on is inherited, according to a region ID indicating regions' dependency, in the RWP coding configuration of the dependent frame;
or
in response to there being no region ID indicating regions' dependency, determining an $m^{th}$ region in the frame that is depended on is inherited, when the region-inherited flag of an $m^{th}$ region in the dependent frame indicates having regions' dependency, wherein m is zero or a positive integer, and m is less than or equal to M-1, M being a smaller of a total number of regions in the dependent frame and a total number of regions in the frame that is depended on.

19. The method according to claim 12, wherein the method further comprises:
when the RWP coding configuration of one of the dependent frames further comprises a region-discarded flag, skipping comparing a region in the frame that is depended on indicated by the region-discarded flag with a region in the dependent frame.

20. A processing device, at least comprising: a processor and a memory for storing executable instructions capable of running on the processor, wherein when executing the executable instructions, the processor perform a video coding method, the method comprising:
classifying video frames into independent frames and dependent frames, wherein the dependent frames comprise a first type of the dependent frames;
generating region wise packing (RWP) coding configuration of each of the independent frames by coding parameters of the respective one of the independent frames, wherein the RWP coding configuration of the independent frames comprises the parameters to be unpacked to restore the video; and for each of the first type of the dependent frames, generating RWP coding configuration of the dependent frame by coding parameters of the dependent frame based on difference and dependency between the parameters of the dependent frame and the parameters of an independent frame used as a reference for the coding of the dependent frame; wherein the dependency indicates that the dependent frame has at least one parameter the same as at least one parameter of the independent frame.

* * * * *